(12) United States Patent
Dobelstein et al.

(10) Patent No.: US 8,510,162 B1
(45) Date of Patent: Aug. 13, 2013

(54) LOYALTY HOST INTERFACE

(75) Inventors: Joshua Dobelstein, Suwanee, GA (US);
Ernesto Priego, Cumming, GA (US);
Honza Fedak, Alpharetta, GA (US);
Arun Sharma, Acworth, GA (US);
Mike Jones, Suwanee, GA (US); Rob Parker, Atlanta, GA (US)

(73) Assignee: Radiant Systems, Inc., Alpharetta, GA (US)

( * ) Notice: Subject to any disclaimer, the term of this patent is extended or adjusted under 35 U.S.C. 154(b) by 259 days.

(21) Appl. No.: 12/036,922

(22) Filed: Feb. 25, 2008

(51) Int. Cl.
*G06Q 30/00* (2006.01)
(52) U.S. Cl.
USPC ............ 705/14.38; 705/1; 705/14; 705/41; 705/28; 705/30; 705/17; 705/7; 705/16; 705/39; 705/37; 705/22; 705/24; 705/40; 705/21; 705/77; 235/375; 235/379; 235/383; 235/462
(58) Field of Classification Search
USPC ................................................ 705/26
See application file for complete search history.

(56) References Cited

U.S. PATENT DOCUMENTS

| | | | |
|---|---|---|---|
| 5,694,326 A | 12/1997 | Warn et al. | |
| 5,842,188 A | 11/1998 | Ramsey et al. | |
| 6,055,521 A | 4/2000 | Ramsey et al. | |
| 6,523,744 B2 | 2/2003 | Royal et al. | |
| 6,527,176 B2 | 3/2003 | Baric | |
| 6,808,112 B2 | 10/2004 | Jacobi et al. | |
| 6,810,304 B1 | 10/2004 | Dickson | |
| 7,163,145 B2 * | 1/2007 | Cohagan et al. | 235/380 |
| 7,201,315 B2 | 4/2007 | Symonds et al. | |
| 2002/0046116 A1 * | 4/2002 | Hohle et al. | 705/14 |
| 2002/0147648 A1 | 10/2002 | Fadden et al. | |
| 2002/0156683 A1 * | 10/2002 | Stoutenburg et al. | 705/16 |
| 2003/0009382 A1 | 1/2003 | D'Arbeloff et al. | |
| 2003/0131904 A1 | 7/2003 | Dodson | |
| 2003/0200144 A1 * | 10/2003 | Antonucci et al. | 705/14 |
| 2004/0098317 A1 | 5/2004 | Postrel | |
| 2005/0192832 A1 | 9/2005 | Call et al. | |
| 2005/0267800 A1 | 12/2005 | Tietzen et al. | |
| 2006/0111978 A1 | 5/2006 | Tietzen et al. | |
| 2007/0038515 A1 | 2/2007 | Postrel | |
| 2007/0255662 A1 * | 11/2007 | Tumminaro | 705/79 |

FOREIGN PATENT DOCUMENTS

| | | |
|---|---|---|
| CA | 2354287 | 4/2002 |
| WO | WO00/75065 | 12/2000 |

OTHER PUBLICATIONS

Greenberg, Joshua Harry. Content-Oriented Architecture for Consumer-To-Business eCommerce. 2002. Dissertation Presented to Graduate School of University of Florida.*
Phoenix Technology, "Loyalty Central", available at http://www-phoenix-tec.com/products/loyalty-central/, pp. 1-3, retrieved Aug. 10, 2007.

(Continued)

*Primary Examiner* — F. Zeender
*Assistant Examiner* — Fawaad Haider
(74) *Attorney, Agent, or Firm* — Kevin P. Belote

(57) ABSTRACT

The present invention relates to translating loyalty requests between loyalty clients and loyalty hosts. For example, one embodiment of the present invention provides a method for translating point-of-sale loyalty requests by using a loyalty request to create a translated loyalty request that is compatible with a loyalty host and by using the loyalty response to create a translated loyalty response that is compatible with the loyalty client.

17 Claims, 7 Drawing Sheets

(56) References Cited

OTHER PUBLICATIONS

SurfGold Consultancy, "Loyalty Engine", available at http://www.surfgold.com/corp/products_loyalty_engine.htm, pp. 1-2, retrieved Aug. 10, 2007.

Classmates Media Corporation, "MyPoints is easy, it's free and it really works!", available at http://www.mypoints.com/emp/u/howItWorks.vm, pp. 1, retrieved Aug. 10, 2007, copyright 2004.

Imai et al., *An Enhanced Application Gateway for some Web services to Personal Mobile Systems*, Proceedings of the 2005 International Conference on Computational Intelligence for Modeling, Control and Automation, and International Conference on Intelligent Agents, Web Technologies and Internet Commerce, vol. 2, Nov. 2005, p. 1055-60.

RMS Solutions, Inc., "RMS Products", available at http://70.72.98.252/RMS/RMSWeb/DesktopDefault.aspx?tabindex=39&tabid=164, pp. 1-2, retrieved Mar. 7, 2008.

RMS Solutions, Inc., "RMS Products: RMS Kiosk/Console/Cardlock System", available at http://70.72.98.252/RMS/RMSWeb/DesktopDefault.aspx?tabindex=27&tabid=157, pp. 1-2, retrieved Mar. 7, 2008.

Dresser Inc., "The future of retail fueling has arrived", pp. 1-2, Copyright 2006.

Radiant Systems, Inc., "Radiant Launches Outdoor Payment Terminal Empowering Petroleum Retailers with an Innovative Platform for EMVT Secure Transactions", available at http://www.radiantsystems.com/news/press-releases/2005/012505.htm, 2005, pp. 1-2, retrieved Mar. 7, 2008.

\* cited by examiner

LOYALTY HOST INTERFACE

BACKGROUND OF THE INVENTION

As the number of loyalty solutions in the marketplace increases, customers are developing preferences for specific loyalty programs. At the same time, small retailers are developing relationships with larger retailers to honor their loyalty programs at their sites. Further, as the number of loyalty solutions in the marketplace increases, the number of programs and discount types that are offered to customers is increasing at a faster rate than point-of-sale ("POS") technologies can change.

Many loyalty programs implemented in a retail environment require custom interfaces in order to collect proper information about sales from the POS and to deliver appropriate discounts to the POS. Often this requires that the retail merchant purchase a loyalty program from their POS provider or spend a substantial amount of money. To further complicate matters, the cost of transaction fees across hosted clearing houses keeps increasing.

Accordingly, there is a need in the art for a mechanism by which loyalty programs and POS devices can easily talk to each other and enable a given loyalty client to access a large number of loyalty programs without requiring custom interfaces. There is also a need in the art for a means of supporting new loyalty programs and discount types without requiring costly changes to POS systems. There is a further need for a means to effectively interpret discount types and offers and present it to the POS system using types already supported.

SUMMARY OF THE INVENTION

The present invention provides methods, systems, and computer program products (hereinafter "method" or "methods" for convenience) for translating loyalty requests.

One embodiment of the present invention provides a method for translating loyalty requests, comprising: receiving a loyalty request from a loyalty client; using the loyalty request to create a translated loyalty request that is compatible with a first loyalty host; sending the translated loyalty request to the first loyalty host; receiving a loyalty response from the first loyalty host; using the loyalty response to create a translated loyalty response that is compatible with the loyalty client; and sending the translated loyalty response to the loyalty client.

Another embodiment of the present invention provides a computer program product carried in a computer readable medium, wherein the computer program product is encoded to perform a method for translating point-of-sale loyalty requests, comprising: receiving by a loyalty engine a loyalty request from a loyalty client over a first connection, wherein the loyalty request comprises request data; using by the loyalty engine the loyalty request to create a translated loyalty request that is compatible with a first loyalty host; sending the translated loyalty request to the first loyalty host over a second connection; receiving a loyalty response from the first loyalty host over the second connection, wherein the loyalty response comprises response data; using by the loyalty engine the loyalty response to create a translated loyalty response that is compatible with the loyalty client; and sending the translated loyalty response to the loyalty client over the first connection.

A further embodiment of the present invention provides a system comprising a processor programmed to perform the steps of: receiving by a loyalty engine a loyalty request from a loyalty client over a first connection, wherein the loyalty request comprises request data; using by the loyalty engine the loyalty request to create a translated loyalty request that is compatible with a first loyalty host; sending the translated loyalty request to the first loyalty host over a second connection; receiving a loyalty response from the first loyalty host over the second connection, wherein the loyalty response comprises response data; using by the loyalty engine the loyalty response to create a translated loyalty response that is compatible with the loyalty client; and sending the translated loyalty response to the loyalty client over the first connection.

Another embodiment of the present invention provides a method for translating point-of-sale loyalty requests, comprising: receiving by a loyalty engine a loyalty request from a loyalty client over a first connection, wherein the loyalty request comprises request data; using by the loyalty engine the loyalty request to determine the first loyalty host from a plurality of loyalty hosts that are connected to the loyalty engine; using by the loyalty engine the loyalty request to create a translated loyalty request that is compatible with the first loyalty host from the plurality of loyalty hosts by changing the request data to be compatible with the first loyalty host, wherein the loyalty engine comprises a processor and a memory; sending the translated loyalty request to the first loyalty host over a second connection comprising a TCP connection; receiving a loyalty response from the first loyalty host over the second connection, wherein the loyalty response comprises response data; using by the loyalty engine the loyalty response to create a translated loyalty response that is compatible with the loyalty client; and sending the translated loyalty response to the loyalty client over the first connection.

Another embodiment of the present invention provides a computer program product carried in a computer readable medium, wherein the computer program product is encoded to perform a method for translating point-of-sale loyalty requests, comprising: receiving by a loyalty engine a loyalty request from a loyalty client over a first connection, wherein the loyalty request comprises request data; using by the loyalty engine the loyalty request to determine the first loyalty host from a plurality of loyalty hosts that are connected to the loyalty engine; using by the loyalty engine the loyalty request to create a translated loyalty request that is compatible with the first loyalty host from the plurality of loyalty hosts by changing the request data to be compatible with the first loyalty host, wherein the loyalty engine comprises a processor and a memory; sending the translated loyalty request to the first loyalty host over a second connection comprising a TCP connection; receiving a loyalty response from the first loyalty host over the second connection, wherein the loyalty response comprises response data; using by the loyalty engine the loyalty response to create a translated loyalty response that is compatible with the loyalty client; and sending the translated loyalty response to the loyalty client over the first connection.

A further embodiment of the present invention provides a system comprising a processor programmed to perform the steps of: receiving by a loyalty engine a loyalty request from a loyalty client over a first connection, wherein the loyalty request comprises request data; using by the loyalty engine the loyalty request to determine the first loyalty host from a plurality of loyalty hosts that are connected to the loyalty engine; using by the loyalty engine the loyalty request to create a translated loyalty request that is compatible with the first loyalty host from the plurality of loyalty hosts by changing the request data to be compatible with the first loyalty host, wherein the loyalty engine comprises a processor and a memory; sending the translated loyalty request to the first loyalty host over a second connection comprising a TCP connection; receiving a loyalty response from the first loyalty host over the second connection, wherein the loyalty response comprises response data; using by the loyalty engine the loyalty response to create a translated loyalty response that is compatible with the loyalty client; and sending the translated loyalty response to the loyalty client over the first connection.

A further embodiment of the present invention provides a method for translating loyalty requests between loyalty clients and loyalty hosts, comprising: receiving by a loyalty engine a loyalty request from a loyalty client over a first connection, wherein the loyalty request comprises request data; using by the loyalty engine the loyalty request to determine a first loyalty host from a plurality of loyalty hosts that are connected to the loyalty engine; using by the loyalty engine the loyalty request to create a translated loyalty request that is compatible with the first loyalty host from the plurality of loyalty hosts by changing the request data to be compatible with the first loyalty host; sending the translated loyalty request to the first loyalty host over a second connection; receiving a loyalty response from the first loyalty host over the second connection, wherein the loyalty response comprises response data; using by the loyalty engine the loyalty response to create a translated loyalty response that is compatible with the loyalty client; and sending the translated loyalty response to the loyalty client over the first connection.

Another embodiment of the present invention provides a computer program product comprising a computer-readable medium that is encoded with instructions for translating loyalty requests between loyalty clients and loyalty hosts, comprising: receiving by a loyalty engine a loyalty request from a loyalty client over a first connection, wherein the loyalty request comprises request data; using by the loyalty engine the loyalty request to determine a first loyalty host from a plurality of loyalty hosts that are connected to the loyalty engine; using by the loyalty engine the loyalty request to create a translated loyalty request that is compatible with the first loyalty host from the plurality of loyalty hosts by changing the request data to be compatible with the first loyalty host; sending the translated loyalty request to the first loyalty host over a second connection; receiving a loyalty response from the first loyalty host over the second connection, wherein the loyalty response comprises response data; using by the loyalty engine the loyalty response to determine the loyalty client from a plurality of loyalty clients that are connected to the loyalty engine; using by the loyalty engine the loyalty response to create a translated loyalty response that is compatible with the loyalty client; and sending the translated loyalty response to the loyalty client over the first connection.

A further embodiment of the present invention provides a system comprising a processor programmed to perform the steps of: receiving by a loyalty engine a loyalty request from a loyalty client over a first connection, wherein the loyalty request comprises request data; using by the loyalty engine the loyalty request to determine a first loyalty host from a plurality of loyalty hosts that are connected to the loyalty engine; using by the loyalty engine the loyalty request to create a translated loyalty request that is compatible with the first loyalty host from the plurality of loyalty hosts by changing the request data to be compatible with the first loyalty host; sending the translated loyalty request to the first loyalty host over a second connection; receiving a loyalty response from the first loyalty host over the second connection, wherein the loyalty response comprises response data; using by the loyalty engine the loyalty response to determine the loyalty client from a plurality of loyalty clients that are connected to the loyalty engine; using by the loyalty engine the loyalty response to create a translated loyalty response that is compatible with the loyalty client; and sending the translated loyalty response to the loyalty client over the first connection.

It will be apparent to those skilled in the art that various devices may be used to carry out the systems, methods, apparatuses, or computer program products of the present invention, including point-of-sale terminals, fuel controllers, island card readers, personal digital assistants, wireless communication devices, personal computers, or dedicated hardware devices designed specifically to carry out aspects of the present invention. While aspects of the present invention may be described and claimed in a particular statutory class, such as the system statutory class, this is for convenience only and one of skill in the art will understand that each aspect of the present invention can be described and claimed in any statutory class, including systems, apparatuses, methods, and computer program products.

Unless otherwise expressly stated, it is in no way intended that any method or aspect set forth herein be construed as requiring that its steps be performed in a specific order. Accordingly, where a method, system, or computer program product claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The foregoing and other advantages and features of the invention will become more apparent from the detailed description of embodiments of the invention given below with reference to the accompanying drawings.

In the following detailed description, reference is made to the accompanying drawings, which form a part hereof, and in which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

DETAILED DESCRIPTION OF THE INVENTION

Before the present methods, systems, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders; reference to "an encoder" includes mixtures of two or more such encoders, and the like.

Figure 1:
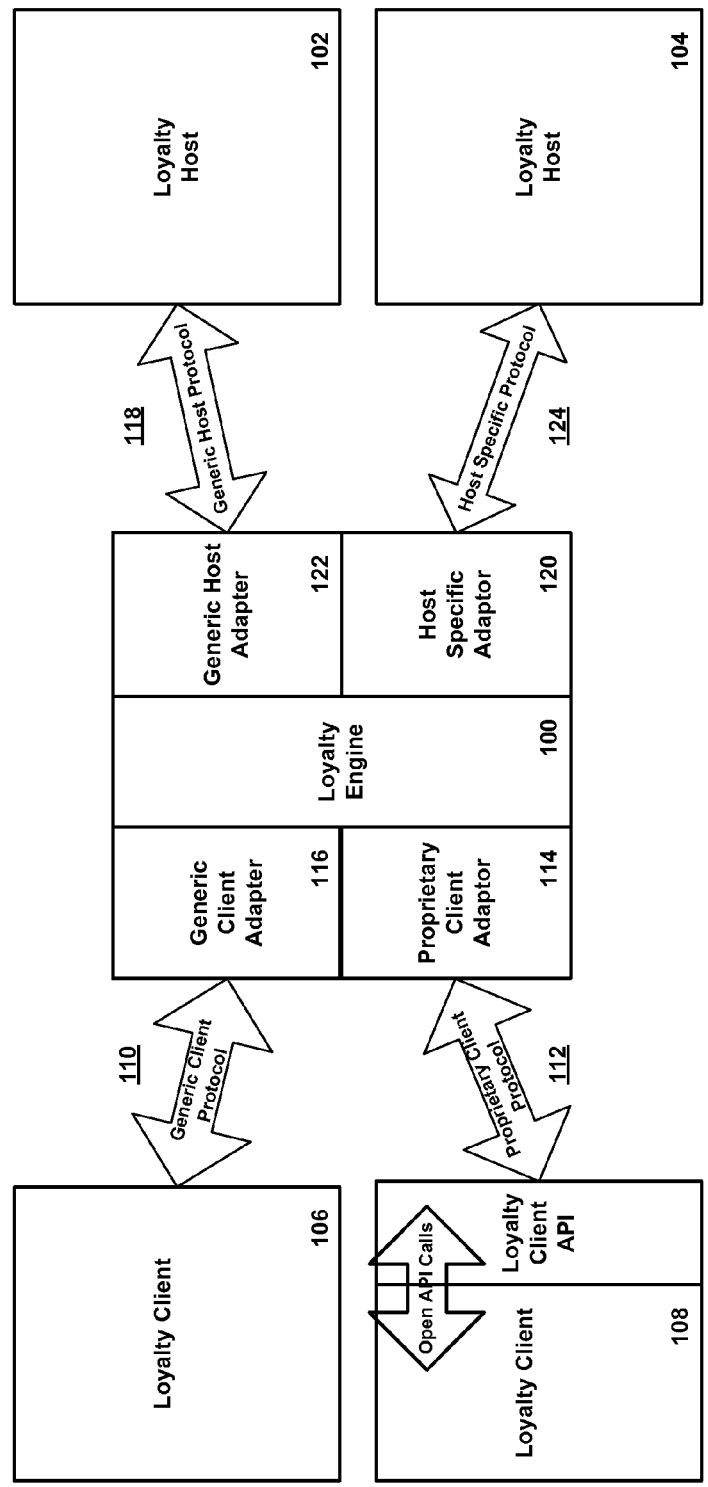
FIG. 1 illustrates a system of one embodiment of the present invention.

FIG. 1 shows the system of one embodiment of the present invention. As seen in FIG. 1, a loyalty engine 100 is a common platform for supporting loyalty programs through host interfaces. The loyalty engine 100 manages the interaction with the loyalty hosts 102, 104 and provides a common way to interface loyalty clients 106, 108 with loyalty hosts 102, 104. The loyalty engine 100 can interface with the loyalty clients 106, 108 using different methods. For example, the loyalty engine 100 can interface with a loyalty client using a generic protocol called the Generic Client Protocol 110. Any client can interface the loyalty engine 100 using the Generic Client Protocol 110. The loyalty engine 100 can also provide a client API that provides a client side interface to the Generic Client Protocol 110.

The Generic Client Protocol 110, as seen in FIG. 1, is an open protocol a client 106 can use to interface with a Generic Client Adapter 116, which communicates with the loyalty engine 100. The Proprietary Client Protocol 112 is the protocol that the loyalty client API can use to interface with the loyalty engine 100 via a Proprietary Client Adapter 114. The loyalty engine Client API is a client side API that can be used for interfacing with loyalty engine 100. The Generic Client Adaptor 116 can implement the interface defined for the Generic Client Protocol 110. The Proprietary Client Adaptor 114 can implement the interface defined for the Proprietary Client Protocol 112. The Generic Host Adaptor 122 can implement the interface defined for the Generic Host Protocol 118. A Host Specific Adaptor 120 can implement a host specific interface to a loyalty host 104. The Generic Host Protocol 118 is an open protocol that can be used for interfacing the loyalty engine 100 with a loyalty host 102.

Figure 2:
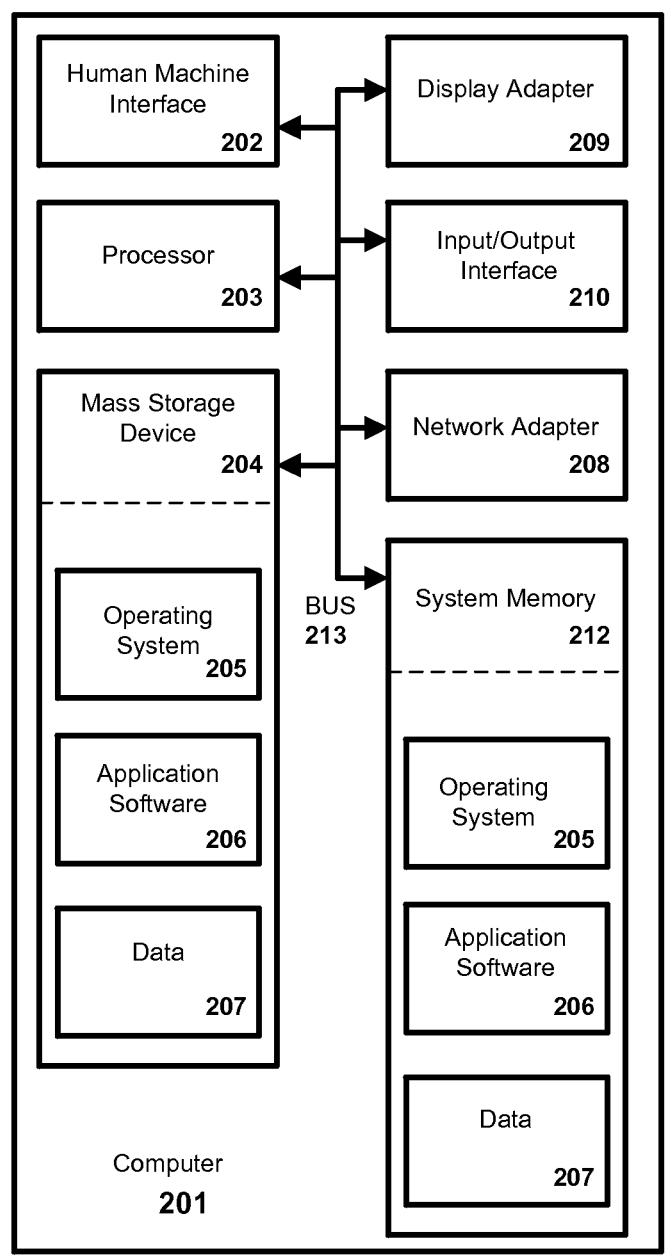
FIG. 2 illustrates a computer system that can be used to carry out embodiments of the present invention.

A loyalty client, loyalty engine, or loyalty host of any embodiment of the present invention can comprise or execute on a general purpose computer 201 as illustrated in FIG. 2. Multiple loyalty hosts can comprise or execute on the same physical computer. Similarly, multiple loyalty clients can operate on the same device. The components of the computer 201 can include, but are not limited to, one or more processors or processing units 203, a system memory 212, and a system bus 213 that couples various system components including the processor 203 to the system memory 212.

The processor 203 in FIG. 2 can be an x-86 compatible processor, including a CORE DUO, manufactured by Intel Corporation or an ATHLON X2 processor, manufactured by Advanced Micro Devices Corporation. Processors utilizing other instruction sets may also be used, including those manufactured by Apple, IBM, or NEC. For example, the processor 203 can be an XSCALE processor.

The system bus 213 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 213, and all buses specified in this description can also be implemented over a wired or wireless network connection and each of the subsystems, including the processor 203, a mass storage device 204, an operating system 205, application software 206, data 207, a network adapter 208, system memory 212, an Input/Output Interface 210, a display adapter 209, a display device 211, and a human machine interface 202, can be contained within one or more remote computing devices at physically separate locations, connected through buses of this form, in effect implementing a fully distributed system.

The operating system 205 in FIG. 2 includes operating systems such as MICROSOFT WINDOWS VISTA, MICROSOFT WINDOWS XP, WINDOWS CE, WINDOWS 2000, WINDOWS NT, or WINDOWS 98, and REDHAT LINUX, FREE BSD, or SUN MICROSYSTEMS SOLARIS. Additionally, the application software 206 may include web browsing software, such as MICROSOFT INTERNET EXPLORER or MOZILLA FIREFOX, enabling a user to view HTML, SGML, XML, or any other suitably constructed document language on the display device 211.

The computer 201 typically includes a variety of computer readable media. Such media can be any available media that is accessible by the computer 201 and includes both volatile and non-volatile media, removable and non-removable media. The system memory 212 includes computer readable media in the form of volatile memory, such as random access memory (RAM), and/or non-volatile memory, such as read only memory (ROM). The system memory 212 typically contains data such as data 207 and/or program modules such as operating system 205 and application software 206 that are immediately accessible to and/or are presently operated on by the processing unit 203.

The computer 201 may also include other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example, a mass storage device 204 can be a hard disk, a removable magnetic disk, a removable optical disk, magnetic cassette, magnetic storage device, flash memory device, CD-ROM, digital versatile disk (DVD) or other optical storage, random access memories (RAM), read only memories (ROM), solid state storage units, electrically erasable programmable read-only memory (EEPROM), and the like.

Any number of program modules can be stored on the mass storage device 204, including by way of example, an operating system 205 and application software 206. Each of the operating system 205 and application software 206 (or some combination thereof) may include elements of the programming and the application software 206. Data 207 can also be stored on the mass storage device 204. Data 204 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 201 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 203 via a human machine interface 202 that is coupled to the system bus 213, but may be connected by other interface and bus structures, such as a parallel port, serial port, game port, or a universal serial bus (USB).

A display device can also be connected to the system bus 213 via an interface, such as a display adapter 209. For example, a display device can be a cathode ray tube (CRT) monitor, a Liquid Crystal Display (LCD), or a television. In addition to the display device, other output peripheral devices can include components such as speakers (not shown) and a printer (not shown) which can be connected to the computer 201 via Input/Output Interface 210. The Input/Output Interface 210 can include an interface for connecting to devices which communication over serial, parallel, or legacy connections such current loop, RS485, RS422, RS232, or LON.

The computer 201 can operate in a networked environment using logical connections to one or more remote computing devices. By way of example, a remote computing device can be a personal computer, portable computer, a server, a router, a set top box, a network computer, a peer device or other common network node, and so on. Logical connections between the computer 201 and a remote computing device can be made via a local area network (LAN) and a general wide area network (WAN). Such network connections can be through a network adapter 208. A network adapter 208 can be implemented in both wired and wireless environments. Such networking environments are commonplace in offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of application software 206 may be stored on or transmitted across some form of computer readable media. An implementation of the disclosed methods may also be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state devices, or any other medium which can be used to store the desired information and which can be accessed by a computer.

The messaging between one or more of a loyalty client, a loyalty engine, and a loyalty host can be performed using Remote Procedure Call (RPC) using Simple Object Access Protocol (SAOP) over HTTP in any embodiment of the present invention. In the alternative, a messaging protocol using TCP/IP sockets directly can also be used in any embodiment of the present invention. XML can be used as the message format in any embodiment of the present invention. However, any suitable format can be used.

Several message types can be defined and used in various embodiments of the present invention. For example, an authentication or "AUTH" message can be used to validate a loyalty transaction, retrieve discounts based on details that are available in the message contents, and for points locking. An authentication cancel or "AUTH_CANCEL" message can be used to indicate to a loyalty host that locked points should be released, and to indicate that no "CAPTURE" message will be sent for a given transaction. A CAPTURE message can be used for points accumulation based on the items specified in the message contents, points redemption based on the approved rewards specified in the message contents, and points unlocking for any unused rewards. A "STATUS" message can be used to query a loyalty host to determine its status, such as to convey if the loyalty host is offline or if an error condition has occurred.

Figure 3:
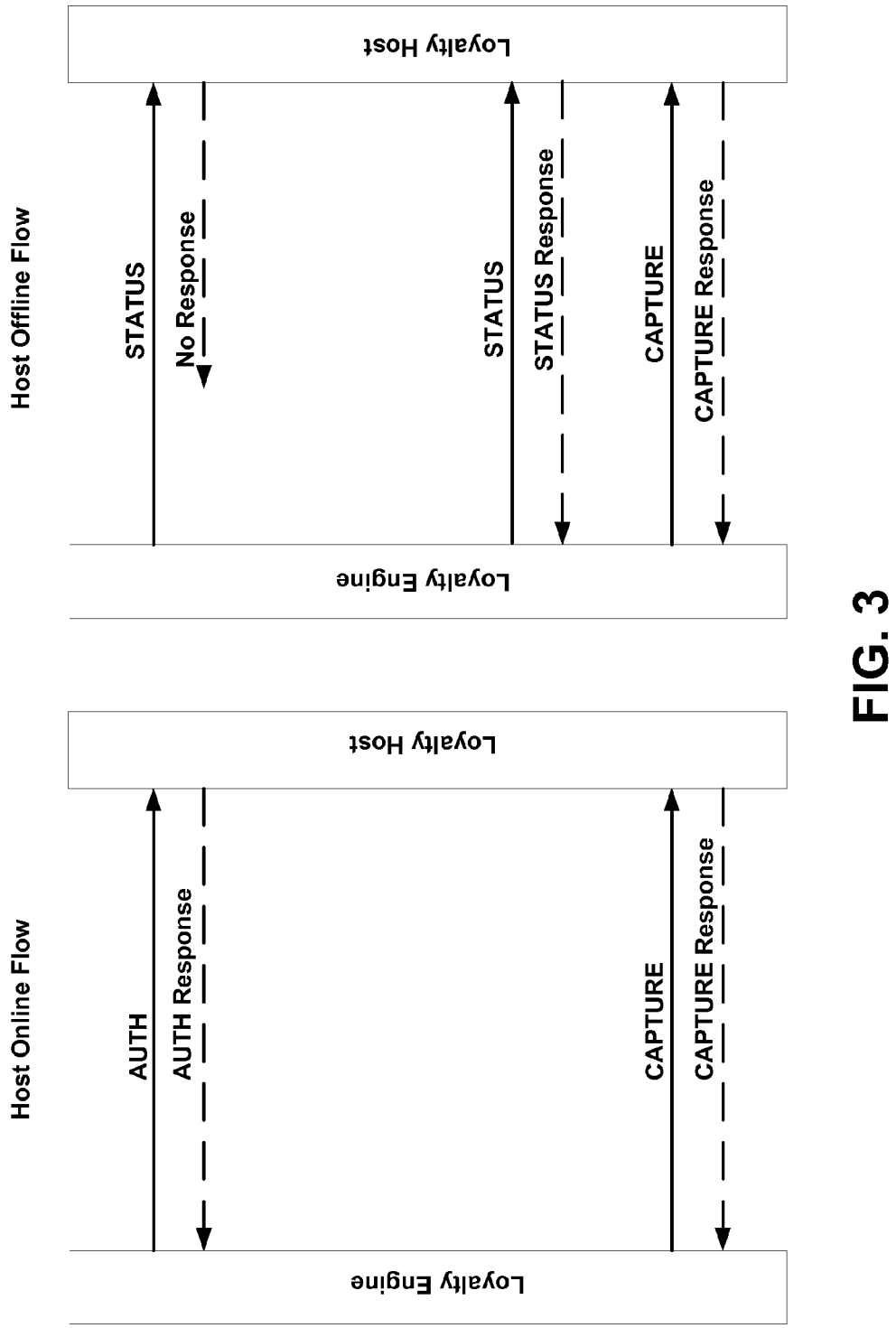
FIG. 3 illustrates the message flow of one embodiment of the present invention.

A message flow diagram is shown in FIG. 3, which depicts a high level message interaction between a loyalty engine and a loyalty host for a transaction of one embodiment of the present invention. A host authorization code can be used to link messages with a corresponding CAPTURE message.

Since there can be a large time difference between the AUTH message and the CAPTURE message for loyalty sales, the loyalty engine can provide support for a host's ability to lock or hold points for the duration of a sale, such as a for a fuel sale, in any embodiment of the present invention. In one aspect, fuel items that have not been dispensed yet can be typed as POTENTIAL items. For example when a customer approaches the fuel pump for a pay-at-pump sale, the AUTH request to the loyalty host will mark the fuel items as POTENTIAL since the amount of fuel is not known yet. An AUTH_CANCEL can be sent if the customer cancels their sale before fully tendering and after an AUTH for the sale has been sent for the POTENTIAL items. In another aspect, if a HostAuthCode is specified in an AUTH message response, the HostAuthCode will be sent as part of the CAPTURE message that contains the purchase information for the any fuel items (both POTENTIAL and SALE sale type) that were specified in the original AUTH message.

The following table is applicable to any embodiment of the present invention and provides a definition of the Operation and LoyaltyItem Status field values depending on the possible different scenarios. The "AUTH" column indicates whether an AUTH message was sent or if it was approved offline. The "Initial CAPTURE" column indicates whether an initial capture was sent and its status. The "Operation Status" and "LoyaltyItem" columns define the Status values that should be used depending on the state of the "AUTH" and "Initial CAPTURE" column.

CAPTURE Status Table

| AUTH | Initial CAPTURE | Operation Status | LoyaltyItem Status |
|---|---|---|---|
| None | Online | PENDING | PENDING |
| None | Offline | APPROVED_OFFLINE | APPROVED_OFFLINE |
| Online | Online | PENDING | APPROVED |
| Online | Offline | APPROVED_OFFLINE | APPROVED |
| Offline | Online | PENDING | APPROVED_OFFLINE |
| Offline | Offline | APPROVED_OFFLINE | APPROVED_OFFLINE |

Each message in any embodiment of the present invention can comprise a request portion and/or a response portion. The details in a request can consist of the elements or fields that are necessary to accomplish the request and provide all the "needed" information for that request to the host. The details in a response can consist of the elements or fields that are necessary to answer the request and provide all the "needed" information for that response to the loyalty client. The "needed" information can vary by message type and loyalty host configuration. Variations of needed tags and inclusion of non-essential tags can be determined by configuration on a host-by-host basis.

By way of non-limiting example, sample messages are given below for message requests and responses. Each sample contains tags and sample values for those tags. For several fields, such as ItemID, the samples list choices that can be made for that field as well as the choice that was chosen in the sample itself denoted between the { } symbols.

In various embodiments, the AUTH message is sent by the loyalty engine to the loyalty host whenever the loyalty engine intends to get authorization and rewards from the host based on the customer information given and the current set of items and potential items in the customer transaction.

The loyalty engine can send one or more of the following to the loyalty host: Header Information; Intention of message (Operation) as an "AUTH" message; loyalty item (i.e. loyalty card) to be validated if not already approved; a list of potential items that should be queried independently for possible rewards; a list of actual items that should be queried as a group for possible rewards; or a Host Authorization Code of a previously approved AUTH message.

The loyalty host can return one or more of the following: an APPROVED/DECLINED/ERROR/PENDING status indicating the result of the desired intention of the message; a HostAuthCode used to tie this message to the CAPTURE of any items listed as POTENTIAL; a validation status of loyalty item including the CUSTOMER_ID; rewards based on the customer and specified item details; and all available information for identifying an item can be conveyed in the ItemID tag. If the loyalty engine is aware of a barcode, NACS category code and external ID for an item, they can be sent, as well.

---

AUTH Request Definition

```
<LoyaltyMessage>
  <Header>
    <SiteID>1</SiteID>
    <ClientSequenceID>1</ClientSequenceID>
    <BusinessPeriod>01-01-2007</BusinessPeriod>
    <ClientID type="ICR | POS | CSS ">1 {POS} </ClientID>
    <MessageTime>2001-12-17T09:30:47-05:00</MessageTime>
    <ClientVersion>1.5</ClientVersion>
  </Header>
  <Operation>
    <Method>AUTH</Method>
    <Status>PENDING</Status>
  </Operation>
  <Details>
    <LoyaltyItem>
      <LineNumber>2</LineNumber>
      <LoyaltyID type="CUSTOMER_ID |
          ACCOUNT_NUMBER |
          BARCODE |
          ALTERNATE_ID">5555555555 {ALTERNATE_ID}
</LoyaltyID>
      <Status>PENDING</Status>
    </LoyaltyItem>
    <SalesItem>
      <LineNumber>1</LineNumber>
      <SaleType>SALE | POTENTIAL</SaleType>
      <ItemID type="BARCODE |
          NACS_CATEGORY_CODE |
          CLIENT_GENERIC_PRODUCT_CODE |
          EXTERNAL_ID">01-00-00 {NACS_CATEGORY_CODE}
</ItemID>
    </SalesItem>
  </Details>
</LoyaltyMessage>
```

---

AUTH Response Definition

```
<LoyaltyMessage>
  <Header>
    <SiteID>1</SiteID>
    <ClientSequenceID>1</ClientSequenceID>
    <BusinessPeriod>01-01-2007</BusinessPeriod>
    <ClientID type="ICR | POS | CSS ">1 {POS}</ClientID>
    <MessageTime>2001-12-17T09:30:47-05:00</MessageTime>
    <ClientVersion>1.5</ClientVersion>
  </Header>
  <Operation>
    <Method>AUTH</Method>
    <HostAuthCode>1234</HostAuthCode>
    <Status>APPROVED | DECLINED | ERROR</Status>
  </Operation>
  <Details>
    <LoyaltyItem>
      <LineNumber>2</LineNumber>
      <LoyaltyID type="CUSTOMER_ID">40108512212</LoyaltyID>
      <Status>APPROVED | DECLINED | ERROR</Status>
      <Reward>
        <CouponRewarded type="ITEM_DISCOUNT">
          <RewardCouponID>4444444</RewardCouponID>
          <RewardTarget type="ITEM_NUMBER |
              EXTERNAL_ID |
              BARCODE |
              CLIENT_GENERIC_PRODUCCT_CODE |
              NACS_CATEGORY_CODE">01-00-00
{NACS_CATEGORY_CODE}
          </RewardTarget>
          <RewardValue
type="CURRENCY">0.03</RewardValue>
        </CouponRewarded>
        <Status>PENDING</Status>
      </Reward>
    </LoyaltyItem>
  </Details>
</LoyaltyMessage>
```

---

The AUTH message can be sent to the loyalty host without a HostAuthCode. The host can respond to the message with a HostAuthCode to use in the subsequent CAPTURE message only. The AUTH message can also be sent by the loyalty engine to the loyalty host whenever the loyalty engine intends to cancel a previously approved authorization specified by the host auth code field. This message allows loyalty hosts to provide points locking and timely releasing of points due to canceled/voided customer transactions.

The CAPTURE message can be sent by the loyalty engine to the host whenever the loyalty engine intends to tell the loyalty host the results of an interaction with a customer. The message can contain the loyalty item that identifies the customer, the list of items that the customer purchased, and any rewards that were applied.

If the loyalty engine is aware of a barcode, NACS category code and external ID for an item, one or more may be sent. The loyalty engine may not send the HostAuthCode in CAPTURE messages that do not have fuel items in the transaction.

The "CouponRewarded" tag received in the AUTH response for the reward may be replaced by a "CouponRedeemed" tag to specify the redemption information for a redeemed reward. For example, supposed that the original reward offer was a $0.03 per gallon fuel discount, and that two gallons of fuel were purchased. The loyalty engine indicates to the loyalty host that it has applied a $0.06 total discount to the fuel item mapped to line item number 3. Also, the "Status" tag for the "LoyaltyItem" can be set to APPROVED if the loyalty host had previously approved the LoyaltyItem in an AUTH message. This tag will be set to "PENDING" by the loyalty engine if the loyalty item was approved offline and an AUTH message was never sent to or received from the host.

The STATUS message can be used to query the loyalty host for the status of the host. The message is intended to convey information such as offline or error conditions by the host.

This following defines the individual elements that can make up messages in any embodiment of the present invention. Each section defines the elements that can make up that tag. The LoyaltyMessage element can be the root element for any message in embodiments of the present invention.

"LoyaltyMessage" Schema

```
<LoyaltyMessage>
   <Header/>
   <Operation/>
   <Details/>
</LoyaltyMessage>
```

"LoyaltyMessage" Field Definitions

| Field | Data Type | Description |
|---|---|---|
| Header | Element | The Header section contains client and transaction level information regarding this message and/or transaction |
| Operation | Element | The Operation section indicates the intention of the message and its data as well as the status of the response by the loyalty host for the message. |
| Details | Element | The Details section contains the data that needs to be passed in order to accomplish the action specified in the Operation section. This section can contain data such as loyalty items, merchandise, fuel, etc. |

The Header section can be used to contain client and transaction level information regarding a message and/or transaction.

"Header" Schema

```
<Header>
   <SiteID/>
   <ClientSequenceID/>
   <BusinessPeriod/>
   <ClientID type="ICR|POS|CSS"/>
   <MessageTime/>
   <ClientVersion/>1.5
   <Extension/>
</Header>
```

"Header" Field Definitions

| Field | Data Type | Description |
|---|---|---|
| SiteID | String (16) | Site identifier or site number |
| ClientSequenceID | String(40) | Unique per SiteID and Business Period and used to uniquely identify this interaction with the customer. |
| BusinessPeriod | Date | Business period close date for this site |
| ClientID | Integer | Identifies the client that the request originated at. This may be useful for the host to determine types of messages to display or rewards to offer. Attributes: type = {POS | ICR | CSS} |
| MessageTime | Date Time | The time this message was sent. This will be unique per SiteID, ClientSequenceID, and BusinessPeriod and may be used to avoid duplicate messages. |
| ClientVersion | String(16) | This is the version of loyalty engine that the message originated from. |
| Extension | Element | Custom extension used to pass through data that is not operated on directly by Loyalty engine's generic loyalty processing. |

The Operation section can be used to indicate the intention of the message and its data as well as the status of the response by the loyalty host for the message.

"Operation" Schema

```
<Operation>
   <Method/>
      AUTH|AUTH_CANCEL|CAPTURE|STATUS
   <HostAuthCode/>
   <Status/> PENDING|APPROVED|APPROVED_
      OFFLINE|DECLINED|ERROR
   <ErrorInfo/>
</Operation>
```

"Operation" Field Definitions

| Field | Data Type | Description |
|---|---|---|
| Method | AUTH | AUTH_CANCEL | CAPTURE | STATUS | Indicates the message type. See section describing message types for details. |

"Operation" Field Definitions

| Field | Data Type | Description |
| --- | --- | --- |
| HostAuthCode | String(40) | Unique Identifier created for this transaction. Can be used to tie an AUTH message to a CAPTURE message for functionality such as points locking. If specified by the host in an AUTH message, this code will be returned with a subsequent CAPTURE message containing the completion of potential fuel items specified in the corresponding AUTH. See points locking holding section for details. |
| Status | PENDING | APPROVED | APPROVED_OFFLINE | DECLINED | ERROR | Indicates the status/outcome of the processing of the message by the loyalty host.<br>PENDING - Indicates that the sender would like a request to the request being sent.<br>APPROVED - This message has been processed by the loyalty host and the details have been committed according to the specified method.<br>APPROVED OFFLINE - This message and method was originally approved offline by loyalty engine. The host should still respond with and APPROVED, DECLINED, ERROR, or PENDING status.<br>DECLINED - The details of this message have not been processed and/or committed by the host according to the specified method due to one or more declined items or possibly invalid security.<br>ERROR - The details of this message have not been processed and/or committed by the host according to the specified method due to a processing error. A reason can be given in the ErrorInfo element. |
| ErrorInfo | Element | Used to send error information explaining the reason for a failure or decline. See the ErrorInfo section for details. |

The ErrorInfo message can be used to indicate error information.

"ErrorInfo" Schema 30

```
<ErrorInfo>
  <ErrorID/>
    UNKNOWN_ERROR|HOST_OFFLINE|HOST_
    INTERNAL_ERROR|INVALID_INPUT_
    DATA|INVALID_INPUT_SYNTAX|INVALID_
    HOST_AUTH_CODE|DUPLICATE_MESSAGE
  <ErrorMessage>
</ErrorInfo>
```

35

"ErrorInfo" Field Definitions

| Field | Data Type | Description |
| --- | --- | --- |
| ErrorID | UNKNOWN_ERROR | HOST_OFFLINE | HOST_INTERNAL_ERROR | INVALID_INPUT_DATA | INVALID_INPUT_SYNTAX | INVALID_HOST_AUTH_CODE | DUPLICATE_MESSAGE | The ErrorID indicates the classification of the error that has occurred at the host. |
| ErrorMessage | String(80) | The Error Message field is used to give additional error information for logging and support purposes. |

ErrorID Definitions

| ErrorID | Description |
| --- | --- |
| UNKNOWN_ERROR | Indicates the error does not fall into one of the other pre-defined error ID values. |
| HOST_OFFLINE | Indicates the host is not ready to process requests due to an offline condition. |
| HOST_INTERNAL_ERROR | Indicates that the host experienced an internal error that prevented successful processing.<br>Examples:<br>Unknown exception |
| INVALID_INPUT_DATA | Indicates that the input specified by the client is not valid for the operation.<br>Examples:<br>Letters given instead of numbers for a customer ID. |

-continued

| ErrorID Definitions | |
|---|---|
| ErrorID | Description |
| INVALID_INPUT_SYNTAX | Indicates that the message sent by the client failed schema validation.<br>Examples:<br>Misspelled or unexpected tag name |
| INVALID_HOST_AUTH_CODE | Indicates that the client sent a HostAuthCode value to the host that was not recognized or was no longer valid for the operation. |
| DUPLICATE_MESSAGE | Indicates that the host received a duplicate CAPTURE attempt for a particular HostAuthCode value. |

The Details section contains the data that can be passed in order to accomplish the action specified in the Operation section. This section can contain data such as loyalty items, merchandise, fuel, etc.

"Details" Schema

```
<Details>
    <LoyaltyItem/>
    <SalesItem/>
    <TenderItem/>
</Details>
```

| "Details" Field Definitions | | |
|---|---|---|
| Field | Data Type | Description |
| LoyaltyItem | Element | The LoyaltyItem element is used to specify the loyalty item information associated with this transaction. Reward information can come back from the host as a sub element in the LoyaltyItem section. |
| SalesItem | Element | The SalesItem element is used to specify the item data that is associated with a customer loyalty transaction according to the intent of the message. |
| TenderItem | Element | The TenderItem element is used to specify the tender item data that is associated with a customer loyalty transaction according to the intent of the message. |

The LoyaltyItem element can be used to specify the loyalty item information associated with this transaction. Reward information can come back from the host as a sub-element in the LoyaltyItem section.

"LoyaltyItem" Schema

```
<LoyaltyItem>
    <LineNumber/>
    <LoyaltyID type="CUSTOMER_ID|ACCOUNT_NUMBER|BARCODE|ALTERNATE_ID"/>
    <LoyaltyReceiptDescShort/>
    <CustomerInfo/>
    <Extension/>
    <Status/>
        PENDING|APPROVED|DECLINED|ERROR
    <ErrorInfo/>
    <Reward/>
</LoyaltyItem>
```

| "LoyaltyItem" Field Definitions | | |
|---|---|---|
| Field | Data Type | Description |
| LineNumber | Integer | Uniquely identifies this item in the transaction. |
| LoyaltyID | String(40) | Identifies the loyalty item to the host and client system. Since there can be several ways a loyalty item is identified, loyalty engine can populate this field with the loyalty ID data that it's currently aware of. The loyalty host system can return the corresponding CUSTOMER_ID value for the loyalty item unless it was already specified by the client.<br>CUSTOMER_ID - This is the customer identifier. All other formats of a loyalty ID can be mapped back to this unique identifier by the host. One or more of the ID representations of the customer ID may be the same.<br>ACCOUNT_NUMBER - This is the account number |

"LoyaltyItem" Field Definitions -continued

| Field | Data Type | Description |
|---|---|---|
| | | field that is extracted from mag-stripe card, cobranded card, RFID loyalty, or other similar loyalty items. BARCODE - This is the barcode value if the loyalty card of the item was scanned or entered manually. ALTERNATE_ID - This is an alternate loyalty identifier, usually used for manual entry of a simple number the customer can remember such as their phone number. Attributes: type = {CUSTOMER_ID \| ACCOUNT_NUMBER \| BARCODE \| ALTERNATE_ID} |
| LoyaltyReceiptDescShort | String(16) | Loyalty card/item description that will appear on the customer receipt. If not specified, a default description will be used based on loyalty engine configuration. |
| CustomerInfo | Element | The CustomerInfo element specifies informational data regarding the customer. See the CustomerInfo section for details. |
| Extension | Element | Custom extension used to pass through data that is not operated on directly by loyalty engine's generic loyalty processing. |
| Status | PENDING \| APPROVED \| APPROVED_OFFLINE \| DECLINED \| ERROR | Indicates the status/outcome of the processing of the loyalty item by the loyalty host. Loyalty engine can set the Status to PENDING for any loyalty item that it has not gotten approval for yet by the host. PENDING - This loyalty item has not yet been approved/validated by the loyalty host. APPROVED - This loyalty item has been approved/validated by the loyalty host. DECLINED - This loyalty item has been rejected/declined by the loyalty host. ERROR - There was an error while processing the card. Error information can be given in the ErrorInfo element. |
| ErrorInfo | Element | Used to send detailed error information explaining the reason for a failure or decline. See the ErrorInfo section for details. This is not required for ERROR or DECLINE statuses but is useful for support. |
| Reward | Element | The Reward element specifies the reward to be offered to or redeemed by the customer in this transaction. |

The CustomerInfo element can be used to specify informational data regarding the customer.

"CustomerInfo" Schema

```
<CustomerInfo>
    <RewardProgramInfo/>
    <CustomerMessage/>
</CustomerInfo>
```

The RewardProgramInfo element can be used to specify detailed program information for the customer. Information such as program descriptions, balances and marketing messages by program may be specified in this element.

"RewardProgramInfo" Schema

```
<RewardProgramInfo>
    <RewardProgramID/>
    <ProgramReceiptDescShort/>
    <Points/>
    <ProgramMessage/>
</RewardProgramInfo>
```

"CustomerInfo" Field Definitions

| Field | Data Type | Description |
|---|---|---|
| RewardProgramInfo | Element | The RewardProgramInfo element can specify detailed program information for the customer. Information such as program descriptions, balances and marketing messages by program may be specified in this element. See the program section for details. |
| CustomerMessage | Element | The CustomerMessage element can specify a general marketing message or targeted message to be displayed on the customer receipt. |

| "RewardProgramInfo" Field Definitions | | |
|---|---|---|
| Field | Data Type | Description/Attributes |
| RewardProgramID | String(40) | Identifier for a loyalty program. Default = 0 |
| ProgramReceiptDescShort | String(16) | Short description for the program to be used on the customer receipt. If not specified, the ProgramID can be used. |
| Points | Integer | Specifies a points balance for the associated program for a customer. |
| ProgramMessage | Element | The ProgramMessage element specifies a marketing message specific to a program to be displayed on the customer receipt. |

The ProgramMessage element can be used to specify a marketing message specific to a program to be displayed on the customer receipt.

"ProgramMessage" Schema

```
<ProgramMessage>
    <MessageShort/>
    <MessageLong/>
</ProgramMessage>
```

| "ProgramMessage" Field Definitions | | |
|---|---|---|
| Field | Data Type | Description/Attributes |
| MessageShort | String(80) | Per program message to be displayed on the ICR customer receipt. |
| MessageLong | String(10000) | Per program message to be displayed on the POS customer receipt. |

The CustomerMessage element can be used to specify a general marketing message or targeted message to be displayed on the customer receipt.

"CustomerMessage" Schema

```
<CustomerMessage>
    <MessageShort/>
    <MessageLong/>
</CustomerMessage>
```

| "CustomerMessage" Field Definitions | | |
|---|---|---|
| Field | Data Type | Description/Attributes |
| MessageShort | String(80) | General message to be displayed on the ICR customer receipt. |
| MessageLong | String(10000) | General message to be displayed on the POS customer receipt. |

The Reward element can be used to specify the reward to be offered to or redeemed by the customer in a transaction.

"Reward" Schema

```
<Reward>
    <RewardID/>
    <RewardTrigger
        type="ITEM_NUMBER|EXTERNAL_
        ID|BARCODE|NACS_CATEGORY_CODE|
        CLIENT_GENERIC_PRODUCT_CODE"/>
    <RewardProgramID/>
    <Points/>
    <Restriction
        type="MAX_QUANTITY|SINGLE_USE_
        REWARD|CUSTOMER_CONFIRM"/>
    <CouponRewarded type="ITEM_DISCOUNT"/>
    <CouponRedeemed type="ITEM_DISCOUNT"/>
    <Extension/>
    <Status/>
        PENDING|APPROVED|DECLINED|ERROR
    <ErrorInfo/>
</Reward>
```

| | | "Reward" Field Definitions |
|---|---|---|
| Field | Data Type | Description/Attributes |
| RewardID | String(40) | This identifies the discount to the back office system. This is the ID of the reward which is not necessarily the same as the discount itself. This value is intended for back end usages by back offices and loyalty host that receive the NAXML transaction journal. |
| RewardTrigger | String(40) | Indicates which item, if any, that this reward was triggered by (i.e. item discounts).<br>Attributes:<br>type = {ITEM_NUMBER \| EXTERNAL_ID \| BARCODE \| NACS_CATEGORY_CODE \| CLIENT_GENERIC_PRODUCT_CODE} |
| RewardProgramID | String(40) | Identifier for a loyalty program that the reward is being offered from.<br>Default = 0 |
| Points | Integer | Points value to associate with this reward. In an AUTH message this is the per use cost of the reward. In the CAPTURE message this is the amount of points used by the customer for a reward. |
| Restriction | Dependant on "type" attribute | Used to specify restrictions on this particular reward. The restriction type can be specified by the type attributes (values defined below). The value of the restriction will be specified in the tag text.<br>MAX_QUANTITY - (decimal) -<br>(default for POTENTIAL items: 0 = "No Restriction")<br>(default fon SALES_ITEM items: 1)<br>Specifies a quantity restriction on the discount. Usually used for fuel, this would restrict the discount to lesser of the volume/quantity or the MAX_QUANTITY value multiplied by the discount amount.<br>SINGLE_USE_REWARD - (Y/N) - (default: "Y") - Indicates if this reward can be applied to only a single line item. Note: A single line item may have a quantity greater the 1. If "N" then reward will be applied to all items that qualify.<br>CUSTOMER_CONFIRM - (Y/N) - (default: "N") - This indicates that the customer must choose to accept this discount using the LOYALTY ENGINE reward prompting functionality.<br>Attributes:<br>type = {MAX_QUANTITY \| SINGLE_USE_REWARD \| CUSTOMER_CONFIRM} |
| CouponRewarded | Element | Specified by the in the AUTH response. Indicates details of the available reward such as the discount value and other attributes.<br>The CouponRewarded element may not be sent in the CAPTURE message. The CouponRedeemed element can be used to specify the redeemed reward information in the CAPTURE.<br>The type of coupon will be specified in the type attribute.<br>ITEM_DISCOUNT - The coupon will be applied directly to a single item.<br>Attributes:<br>type = {ITEM DISCOUNT} |
| CouponRedeemed | Element | Specified by client in the CAPTURE message to indicate information about a redeemed reward. Specifies the details of the reward such as the discount value and other attributes.<br>Multiple CouponRedeemed elements may be specified if the reward was applied multiple times.<br>The type of Reward Detail will be specified in the type attribute.<br>ITEM_DISCOUNT - The coupon was applied directly to the item specified by the TargetLineNumber value.<br>Attributes:<br>type ={ITEM_DISCOUNT} |
| Extension | Element | Custom extension used to pass through data that is not operated on directly by loyalty engine's generic loyalty processing. |
| Status | PENDING \| APPROVED \| DECLINED \| ERROR | Indicates the status/outcome of the processing of a reward by the loyalty host and client depending on the message.<br>PENDING - The Reward has not been approved or committed to the customer transaction.<br>APPROVED - The Reward has been either chosen by the customer or automatically added to the transaction.<br>APPROVED_OFFLINE - The AUTH was approved offline by LOYALTY_ENGINE. The host should still respond with and APPROVED, DECLINED, ERROR, or PENDING status.<br>DECLINED - The customer declined to add the reward to the transaction or the reward was not automatically added. Unless specified in configuration DECLINED Rewards will not appear in the CAPTURE message.<br>ERROR - There was an error processing the reward. |
| ErrorInfo | Element | Used to send detailed error information explaining the reason for a failure or decline. See the ErrorInfo section for details. |

The CouponRewarded element can be used to specify the details of the reward such as the discount value and other attributes.

"CouponRewarded" Schema

```
<CouponRewarded type="ITEM_DISCOUNT">
    <RewardCouponID/>
    <RewardTarget
        type="ITEM_NUMBER|EXTERNAL_
        ID|BARCODE|NACS_CATEGORY_
        CODE|CLIENT_GENERIC_PRODUCT_CODE"/>
    <RewardReceiptDescShort/>
    <RewardValue
        type="CURRENCY|PERCENTAGE"/>
</CouponRewarded>
```

"CouponRewarded" Field Definitions

| Field | Data Type | Description |
| --- | --- | --- |
| RewardCouponID | String(40) | This identifies the discount to the back office system. This is the ID of the actual discount as opposed to the ID of the reward which is usually tied to the points.<br>If specified this value may be mappted to an already configured POS discount item through its external ID field.<br>If not specified in the CouponRewarded element in the AUTH response, loyalty engine can use the configured default discount external ID value. |
| RewardTarget | String(40) | Indicates which items, if any, that this reward discount affects. (i.e. item discounts). Multiple RewardTarget tags may be specified if a discount applies to multiple items or a group item identifier such as NACS_CATEGORY_CODE may be used to indicate that this discount affects all items in the group.<br>This value in conjunction with the RewardTrigger will be used to indicate discounts rules such as the presence of a carwash item triggering a discount on fuel. The fuel and carwash would be the trigger items and the fuel would be the item affected.<br>If a RewardTrigger is specified and is the same as the RewardTarget, it is not necessary to specify the RewardTarget. The RewardTrigger value will be used.<br>See Attached documentation for available values for the NACS_CATEGORY_CODE and CLIENT_GENERIC_PRODUCT_CODE types.<br>Attributes:<br>type = {ITEM_NUMBER | EXTERNAL_ID | BARCODE | NACS_CATEGORY_CODE | CLIENT| GENERIC_PRODUCT_CODE} |
| RewardReceiptDescShort | String(16) | Receipt description to use by the client for this discount item. |
| RewardValue | Decimal | Indicates the price/value of the discount that loyalty engine will attempt to apply.<br>CURRENCY - Amount specified indicates a dollar value.<br>PERCENTAGE - Amount specified indicates a percentage value<br>Attributes:<br>type = {CURRENCY | PERCENTAGE} |

The CouponRewarded element can be used to specify the details of a redeemed reward.

"CouponRedeemed" Schema

```
<CouponRedeemed>
    <LineNumber/>
    <RedeemedCouponID/>
    <RedeemedAmount/>
    <TargetLineNumber/>
    <TargetPriceChangeAmount/>
</CouponRewarded>
```

"CouponRedeemed" Field Definitions

| Field | Data Type | Description |
| --- | --- | --- |
| LineNumber | Integer | Populated by the client for the CAPTURE. This is the unique item number representing each instance of a discount line item in the client transaction.<br>If a discount is applied to multiple line items, multiple LineNumber values can be specified. |
| RedeemedCouponID | String(40) | This identifies the discount to the back office system. This is the ID of the actual discount as opposed to the ID of the reward which is usually tied to the points.<br>This value can be mapped to an already configured POS discount item through its external ID field.<br>If not specified in the CouponRewarded element in the AUTH response, loyalty engine can use the configured default discount external ID value. |
| RedeemedAmount | Decimal | Indicates the applied amount of the reward.<br>Calculation:<br>RedeemedAmount = RewardValue * (lesser of either MAX_QUANTITY restriction or SalesQuantity)<br>The above example assumed a CURRENCY RewardValue. For PERCENTAGE, the RewardValue would be multiplied by the ActualSellPrice of the item. |
| TargetLineNumber | Decimal | Indicates which item that the RewardAmount value of the coupon was applied to.<br>Always present for ITEM_DISCOUNT rewards. |
| TargetPriceChangeAmount | Decimal | Specifies the amount that an item's price was changed as a result of the reward redemption. |

The SalesItem element can be used to specify the item data that is associated with a customer loyalty transaction according to the intent of the message.

"SalesItem" Schema

<SalesItem>
  <LineNumber/>
  <SaleType/> SALE|POTENTIAL
  <ItemID type="BARCODE|NACS_CATEGORY_CODE|EXTERNAL_ID|CLIENT_GENERIC_PRODUCT_CODE"/>
  <PumpNumber/>
  <PumpAuthTime/>
  <ActualSalesPrice/>
  <SalesQuantity/>
  <DiscountAmount/>
  <SalesAmount/>
  <Extension/>
</SalesItem>

"SalesItem" Field Definitions

| Field | Data Type | Description |
| --- | --- | --- |
| LineNumber | Integer | Uniquely identifies this item in the transaction. |
| SaleType | SALE \| POTENTIAL | Indicates how this item relates to the other items in the transaction.<br>SALE - SalesItem is being purchased. SalesItem is grouped with all other SALE item on the transaction.<br>POTENTIAL - SalesItem will potentially be purchased. Used for discounts, such as fuel discounts, before the quantity of fuel sold is known. |
| ItemID | String(40) | Identifies the item. Since there can be several ways an item is identified, Loyalty engine can populate this field with each item ID that it's currently aware of. For instance, Desani water has a barcode of 490002762. Its merchandise code is 07-05-00. Therefore, this SalesItem can have two ItemID tags specified; one for the BARCODE and one for the NACS_CATEGORY_CODE. See Attached documentation for available values for the NACS_CATEGORY_CODE and CLIENT_GENERIC_PRODUCT_CODE types.<br>Attributes:<br>type = {EXTERNAL_ID \| BARCODE \| NACS_CATEGORY_CODE \| NACS_TENDER_CODE \| CLIENT_GENERIC_PRODUCT_CODE} |
| PumpNumber | Integer | The pump number or ICR number of this item when applicable. |
| PumpAuthTime | Date Time | The pump authorization time of this item when applicable. |
| ActualSalesPrice | Decimal | This is the unit price that the item was sold at. This amount includes any price change that took place due to manual price change or loyalty price change, such as Fuel Price Rollback. |

"SalesItem" Field Definitions

| Field | Data Type | Description |
|---|---|---|
| SalesQuantity | Decimal | The quantity or volume sold for the item. |
| DiscountAmount | Decimal | The total amount that an item has been discounted. Includes both loyalty and non-loyalty discounts.<br>Calculation:<br>DiscountAmount = (Non-loyalty discounts) + (Non-Fuel Price Rollback loyalty discounts**)<br>** Fuel Price Rollback loyalty discounts are not included in the DiscountAmount value since discounts of this type are reflected in the ActualSalesPrice. |
| SalesAmount | Decimal | The total price an item was sold at.<br>Calculation:<br>SalesAmount = (ActualSalesPrice * SalesQuantity) − DiscountAmount |
| Extension | Element | Custom data that the host may specify for use with loyalty engine custom host plug-in. Data specified here will not pass through to the NAXML Journal by default. |

The TenderItem element can be used to specify the tender item data that is associated with a customer loyalty transaction according to the intent of the message.

"TenderItem" Schema

```
<TenderItem>
  <LineNumber/>
  <TenderCode/>
  <Extension/>
</TenderItem>
```

"TenderItem" Field Definitions

| Field | Data Type | Description |
|---|---|---|
| LineNumber | Integer | Uniquely identifies this item in the transaction. |
| TenderCode | String (tender code) | Specifies the NACS tender code for the tender. See Tender Codes Appendix for possible codes. |
| Extension | Element | Custom data that the host may specify for use with a loyalty engine custom host plug-in. Data specified here will not pass through to the NAXML Journal by default. |

Figure 4:
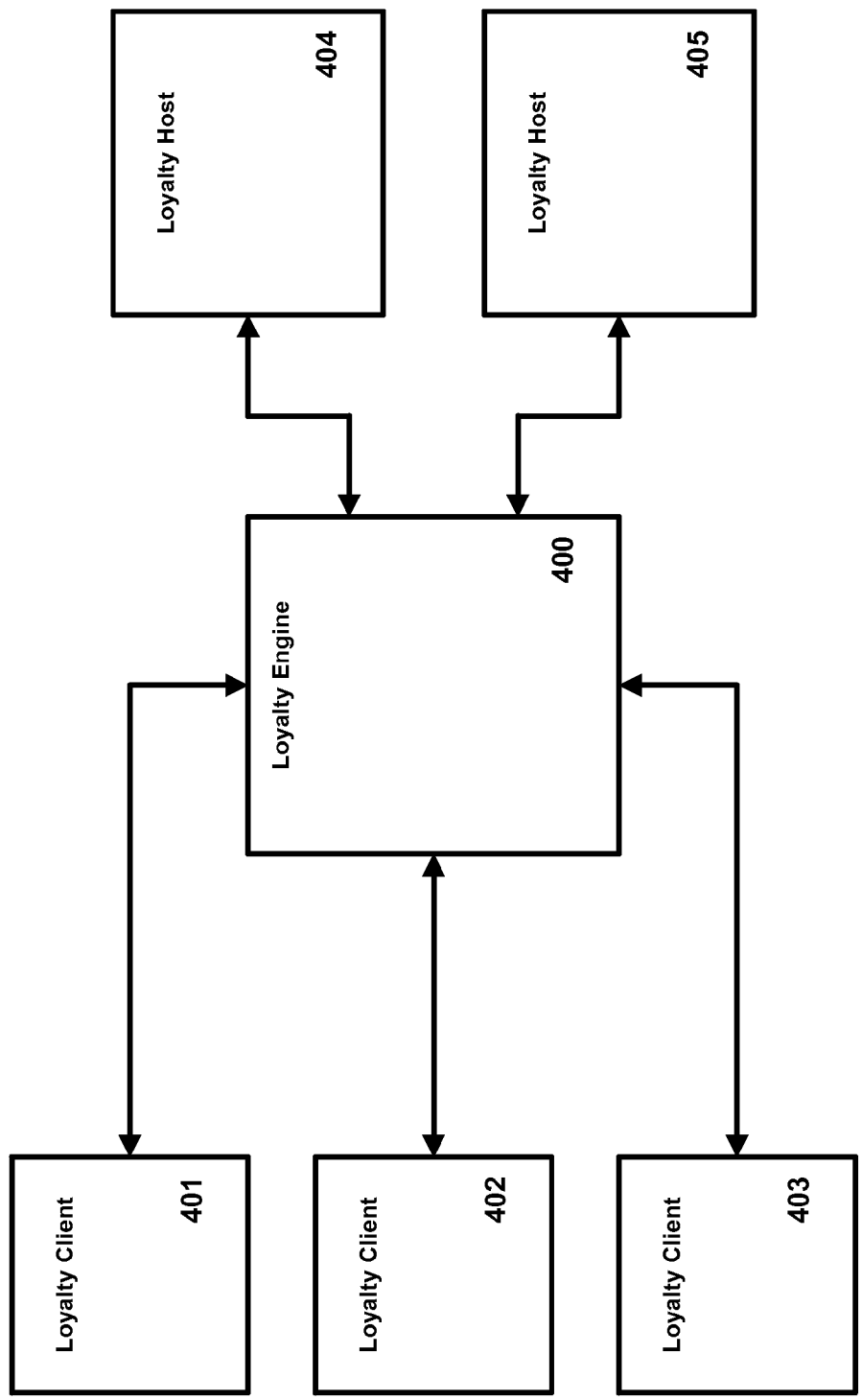
FIG. 4 illustrates a system of another embodiment of the present invention.

FIG. 4 shows the system of one embodiment of the present invention. In the embodiment of FIG. 4, a loyalty engine 400 is coupled to a plurality of loyalty clients 401-403, and is also coupled to a plurality of loyalty hosts 404-405.

In one embodiment, the loyalty engine 400 receives a first loyalty request from a first loyalty client 401 using a first protocol and also receives a second loyalty request from a second loyalty client 402 using a second protocol. The loyalty engine 400 then determines that both loyalty requests are directed to the same loyalty host 404. Since loyalty host 404 communicates with the loyalty engine 400 using the first protocol, the first loyalty request can be passed to the loyalty host 404.

However, since the loyalty host 404 does not understand the second protocol, the loyalty engine of any embodiment of the present invention, such as the loyalty engine 400, can translate the second loyalty request to make it compatible with the loyalty host 404, such as by translating the request data, which can include one or more of a number of loyalty points, a monetary amount, a discount type, a discount amount, a discount identifier, a customer identifier, an account identifier, a barcode, a product code, a status code, a site identifier, a reward program identifier, a sales type identifier, a sales price, a pump number, a message, or any of the message fields described herein. Translating request or response data or fields as used herein includes translating, modifying, adding, removing, or generating such data or fields. Accordingly, translating a request or response as used herein includes creating a new request or response.

The request or response data of any embodiment can be translated by performing string operations such as concatenation, truncation, deletion, or addition. The request or response data of any embodiment can also be translated by mapping request or response data to of from a given protocol, such as by grouping or ungrouping sales items, adding necessary information such as a site or customer identifier, or by removing unnecessary information. Thus, when the loyalty engine receives a corresponding loyalty response from the loyalty host in any embodiment, it can similarly translate the loyalty response to be compatible with a loyalty client, such as by translating the response data that includes one or more of a number of loyalty points, a monetary amount, a discount type, a discount amount, a discount identifier, a customer identifier, an account identifier, a barcode, a product code, a status code, a site identifier, a reward program identifier, a sales type identifier, a sales price, a pump number, a message, or any of the message fields described herein.

For example, the loyalty engine of any embodiment, such as the loyalty engine 400, can translate the loyalty response by performing string operations on the response data in order to make the loyalty response compatible with the second loyalty client 402. The loyalty engine of any embodiment can also translate a loyalty request or a loyalty response by replacing, removing, modifying, or adding one or more fields of or to the loyalty request or loyalty response. For example, the loyalty engine 400 can translate the loyalty response by translating loyalty points, discounts, offers, messages, sales items, coupons, and the like, for compatibility with the second loyalty client 402. Similarly, fields can be added or removed to ensure that the loyalty response is compatible with the second loyalty client 402. In such a manner, the loyalty engine 400 enables any of the loyalty clients 401-403 to communicate with any of the loyalty hosts 404-405.

Figure 5:
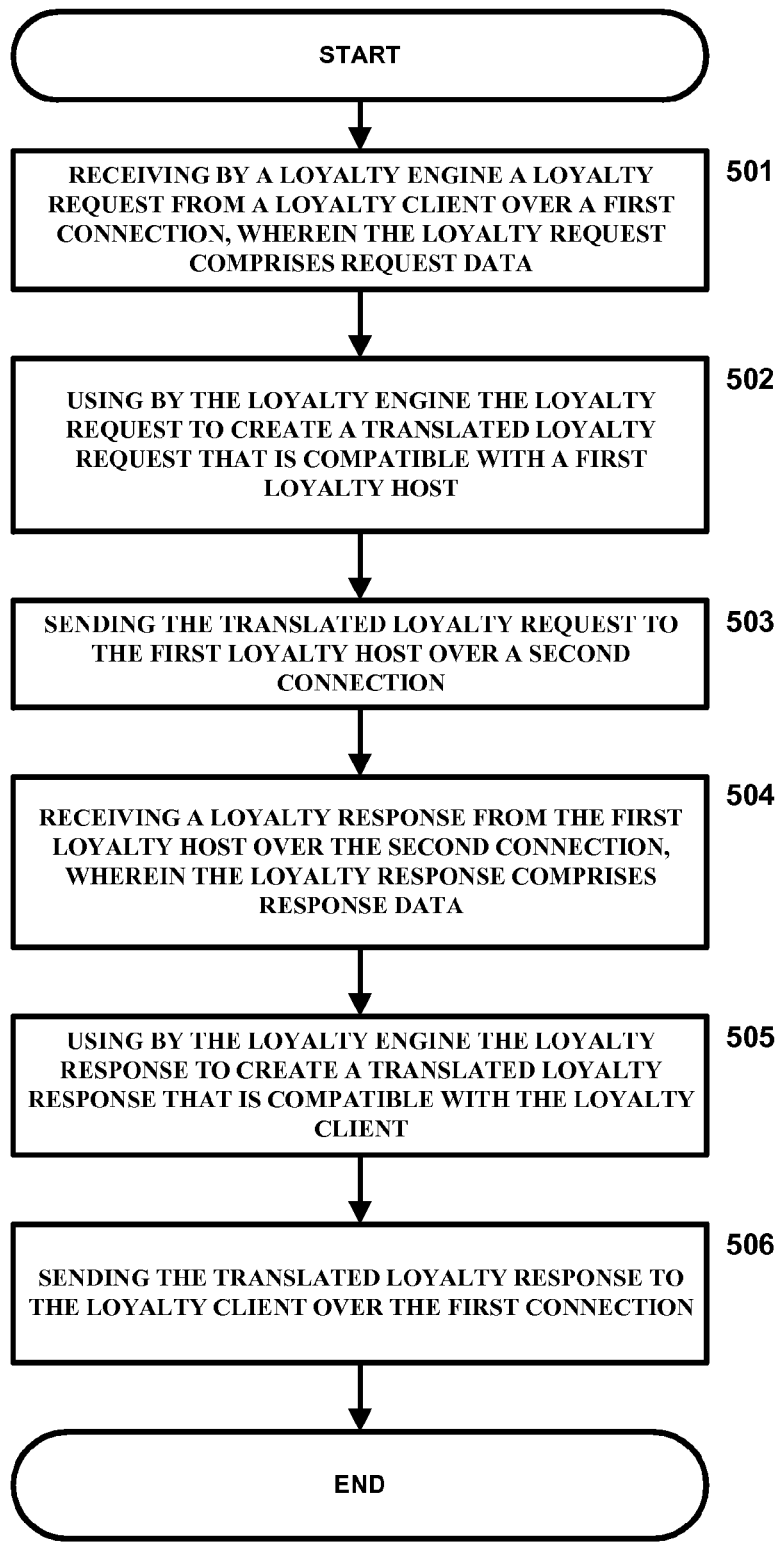
FIG. 5 illustrates a method of one embodiment of the present invention.

One embodiment of the present invention as shown in FIG. 5 provides a method for translating point-of-sale loyalty requests. First, a loyalty engine receives 501 a loyalty request from a loyalty client over a first connection, wherein the loyalty request comprises request data. Second, the loyalty engine uses 502 the loyalty request to create a translated loyalty request that is compatible with a first loyalty host. The loyalty host of any embodiment of the present invention can comprise a processor and a memory. For example, a loyalty host can comprise the computing device described in FIG. 2.

The translated loyalty request is then sent 503 to the first loyalty host over a second connection, and a loyalty response is received 504 from the first loyalty host over the second connection, wherein the loyalty response comprises response data. Fifth, the loyalty engine uses 505 the loyalty response to create a translated loyalty response that is compatible with the loyalty client. Finally, the translated loyalty response is sent 506 to the loyalty client over the first connection.

In another embodiment, the loyalty engine can use the loyalty request to create a translated loyalty request that is compatible with a first loyalty host from among a plurality of loyalty hosts. Each of the plurality of loyalty hosts may be operating a different loyalty program with different messaging requirements, necessitating request translation. In a further embodiment, the method of FIG. 5 further comprises using by the loyalty engine the loyalty request to determine the first loyalty host from among the plurality of loyalty hosts, such as by parsing the request data.

In another embodiment, the loyalty engine uses the loyalty request to create a translated loyalty request that is compatible with a first loyalty host by translating a logical communications protocol of the loyalty client to be compatible with the first loyalty host. Similarly, the loyalty engine can use the loyalty request to create a translated loyalty request that is compatible with a first loyalty host by changing a data format of the request data to be compatible with the first loyalty host. Changing a data format of the request data to be compatible with a loyalty host in any embodiment of the present invention can comprise converting the request data to a specified format or markup language, such as by converting the request data format to XML.

The loyalty engine can also use the loyalty request to create a translated loyalty request that is compatible with a first loyalty host by changing the request data to be compatible with the first loyalty host, in any embodiment of the present invention. Changing the request data to be compatible with the first loyalty host can comprise performing a string operation on the request data in any embodiment of the present invention. For example, the string operation of any embodiment can comprise a string concatenation, truncation, deletion, or addition.

The loyalty engine of any embodiment of the present invention can perform a variety of response translation tasks. For example, the loyalty engine can use the loyalty response to create a translated loyalty response that is compatible with the loyalty client by translating a logical or physical communications protocol of the first loyalty host to be compatible with the loyalty client in any embodiment of the present invention. The loyalty engine can also use the loyalty response to create a translated loyalty response that is compatible with the loyalty client by changing a data format of the response data to be compatible with the loyalty client. Changing a data format of the request data in any embodiment of the present invention can comprise changing the request data to a specified format or markup language, such as by converting the request data to XML.

The loyalty engine can also use the loyalty response to create a translated loyalty response that is compatible with the loyalty client by changing the response data to be compatible with the loyalty client. For example, changing the response data to be compatible with the loyalty client can comprise performing a string operation on the response data.

The loyalty request of any embodiment can be generated by the loyalty client and sent to the loyalty engine. Similarly, the loyalty host can receive the translated loyalty request and send the loyalty response to the loyalty engine.

The first or second connection of any embodiment can comprise at least one of a current loop, RS485, RS422, RS232, LON, TCP, or local bus connection. A TCP connection can comprise one or more of a LAN, WAN, or the Internet.

By way of non-limiting example, the loyalty client can comprise a point-of-sale terminal, fuel controller, an island card reader, or a computer in any embodiment of the present invention. The loyalty engine and loyalty host can comprise software executing on a processor.

Any embodiment of the present invention, such as the embodiment of FIG. 5, can further comprise receiving by the loyalty engine a second loyalty request from a second loyalty client over a third connection, wherein the second loyalty request comprises second request data, and then using by the loyalty engine the loyalty request to create a translated loyalty request that is compatible with a first loyalty host by changing the request data to be compatible with the first loyalty host. The second translated loyalty request can then be sent to the second loyalty host over a fourth connection. Then, a second loyalty response is received from the second loyalty host over the fourth connection, wherein the second loyalty response comprises second response data. The loyalty engine can then use the second loyalty response to create a second translated loyalty response that is compatible with the second loyalty client. Finally, the second translated loyalty response is sent to the second loyalty client over the third connection.

Another embodiment of the present invention provides a computer program product carried in a computer readable medium, wherein the computer program product is encoded to perform a method for translating point-of-sale loyalty requests. First, a loyalty engine receives a loyalty request from a loyalty client over a first connection, wherein the loyalty request comprises request data. Second, the loyalty engine uses the loyalty request to create a translated loyalty request that is compatible with a first loyalty host. The translated loyalty request is then sent to the first loyalty host over a second connection, and a loyalty response is received from the first loyalty host over the second connection, wherein the loyalty response comprises response data. Fifth, the loyalty engine uses the loyalty response to create a translated loyalty response that is compatible with the loyalty client. Finally, the translated loyalty response is sent to the loyalty client over the first connection.

A further embodiment of the present invention provides a system comprising a processor programmed to perform a method for translating point-of-sale loyalty requests. First, a loyalty engine receives a loyalty request from a loyalty client over a first connection, wherein the loyalty request comprises request data. Second, the loyalty engine uses the loyalty request to create a translated loyalty request that is compatible with a first loyalty host. The translated loyalty request is then sent to the first loyalty host over a second connection, and a loyalty response is received from the first loyalty host over the second connection, wherein the loyalty response comprises response data. Fifth, the loyalty engine uses the loyalty response to create a translated loyalty response that is compatible with the loyalty client. Finally, the translated loyalty response is sent to the loyalty client over the first connection.

The processor of any embodiment of the present invention can comprise the computer system shown in FIG. 2.

Figure 6:
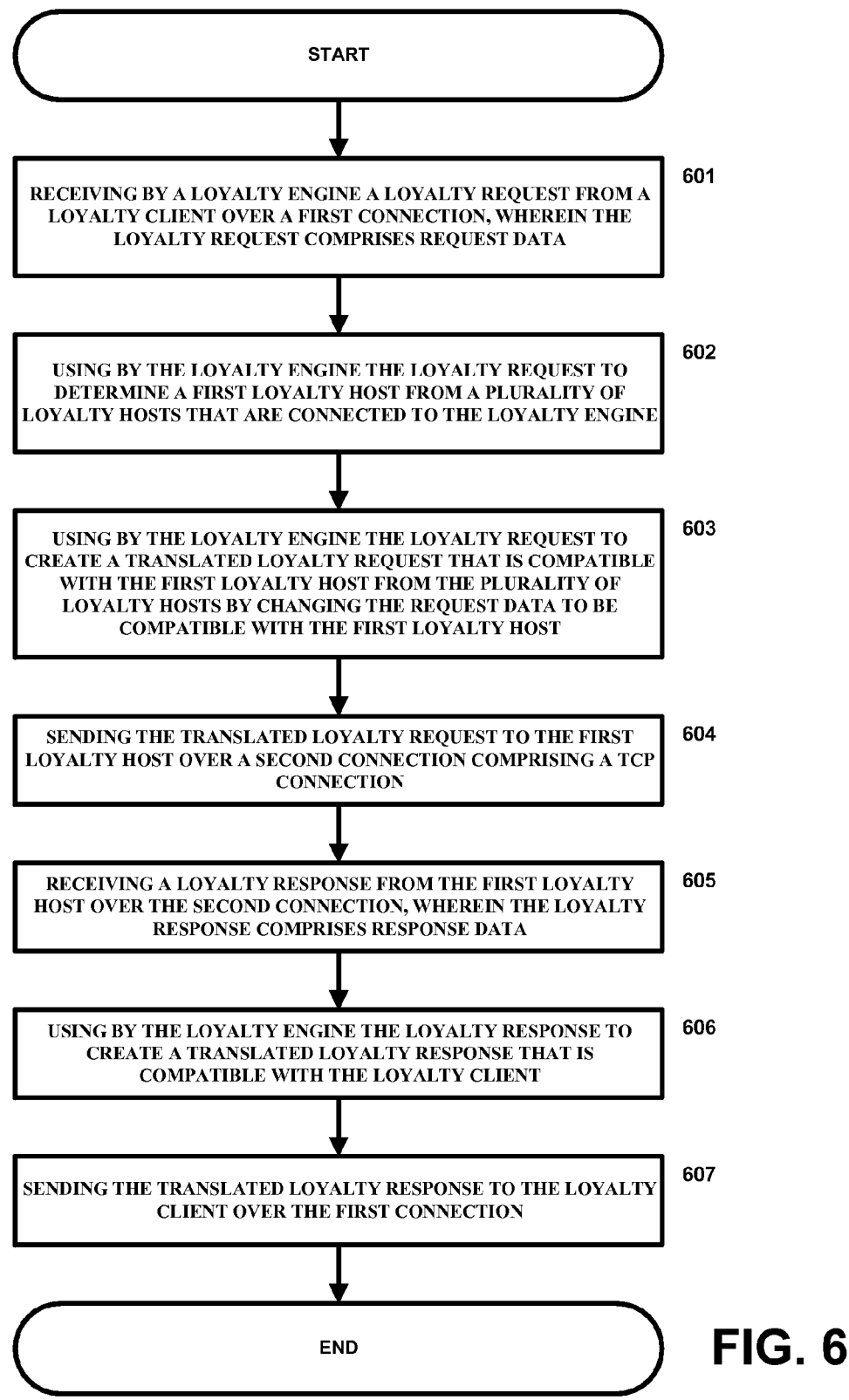
FIG. 6 illustrates a method of another embodiment of the present invention.

Another embodiment of the present invention is shown in FIG. 6. First, a loyalty engine receives 601 a loyalty request from a loyalty client over a first connection, wherein the loyalty request comprises request data. Then, the loyalty engine uses 602 the loyalty request to determine a first loyalty host from a plurality of loyalty hosts that are connected to the loyalty engine. Third, the loyalty engine uses 603 the loyalty request to create a translated loyalty request that is compatible with the first loyalty host from the plurality of loyalty hosts by changing the request data to be compatible with the first loyalty host.

The translated loyalty request is then sent 604 to the first loyalty host over a second connection comprising a TCP connection, and a loyalty response is received 605 over the second connection, wherein the loyalty response comprises response data. The loyalty engine then uses 606 the loyalty response to create a translated loyalty response that is compatible with the loyalty client. Finally, the translated loyalty response is sent 607 to the loyalty client over the first connection.

In an embodiment extending the embodiment of FIG. 6, the loyalty engine uses the loyalty request to create a translated loyalty request that is compatible with a first loyalty host by changing a data format of the request data to be compatible with the first loyalty host. Changing a data format of the request data to be compatible with the first loyalty host can comprise converting the request data to XML.

The loyalty engine of any embodiment can perform a variety of response translation tasks. For example, the loyalty engine can use the loyalty response to create a translated loyalty response that is compatible with the loyalty client by changing the response data to be compatible with the loyalty client. Changing the response data to be compatible with the loyalty client can comprise performing a string operation on the response data.

Another embodiment of the present invention provides a computer program product carried in a computer readable medium, wherein the computer program product is encoded to perform a method for translating point-of-sale loyalty requests, such as the method shown in FIG. 6. First, a loyalty engine receives a loyalty request from a loyalty client over a first connection, wherein the loyalty request comprises request data. Then, the loyalty engine uses the loyalty request to determine a first loyalty host from a plurality of loyalty hosts that are connected to the loyalty engine. Third, the loyalty engine uses the loyalty request to create a translated loyalty request that is compatible with the first loyalty host from the plurality of loyalty hosts by changing the request data to be compatible with the first loyalty host. The translated loyalty request is then sent to the first loyalty host over a second connection comprising a TCP connection, and the first loyalty host receives a loyalty response over the second connection, wherein the loyalty response comprises response data. The loyalty engine then uses the loyalty response to create a translated loyalty response that is compatible with the loyalty client. Finally, the translated loyalty response is sent to the loyalty client over the first connection.

A further embodiment of the present invention provides a system comprising a processor programmed to perform a method for translating point-of-sale loyalty requests, such as shown in FIG. 6. First, a loyalty engine receives a loyalty request from a loyalty client over a first connection, wherein the loyalty request comprises request data. Then, the loyalty engine uses the loyalty request to determine a first loyalty host from a plurality of loyalty hosts that are connected to the loyalty engine. Third, the loyalty engine uses the loyalty request to create a translated loyalty request that is compatible with the first loyalty host from the plurality of loyalty hosts by changing the request data to be compatible with the first loyalty host. The translated loyalty request is then sent to the first loyalty host over a second connection comprising a TCP connection, and the first loyalty host receives a loyalty response over the second connection, wherein the loyalty response comprises response data. The loyalty engine then uses the loyalty response to create a translated loyalty response that is compatible with the loyalty client. Finally, the translated loyalty response is sent to the loyalty client over the first connection.

Figure 7:
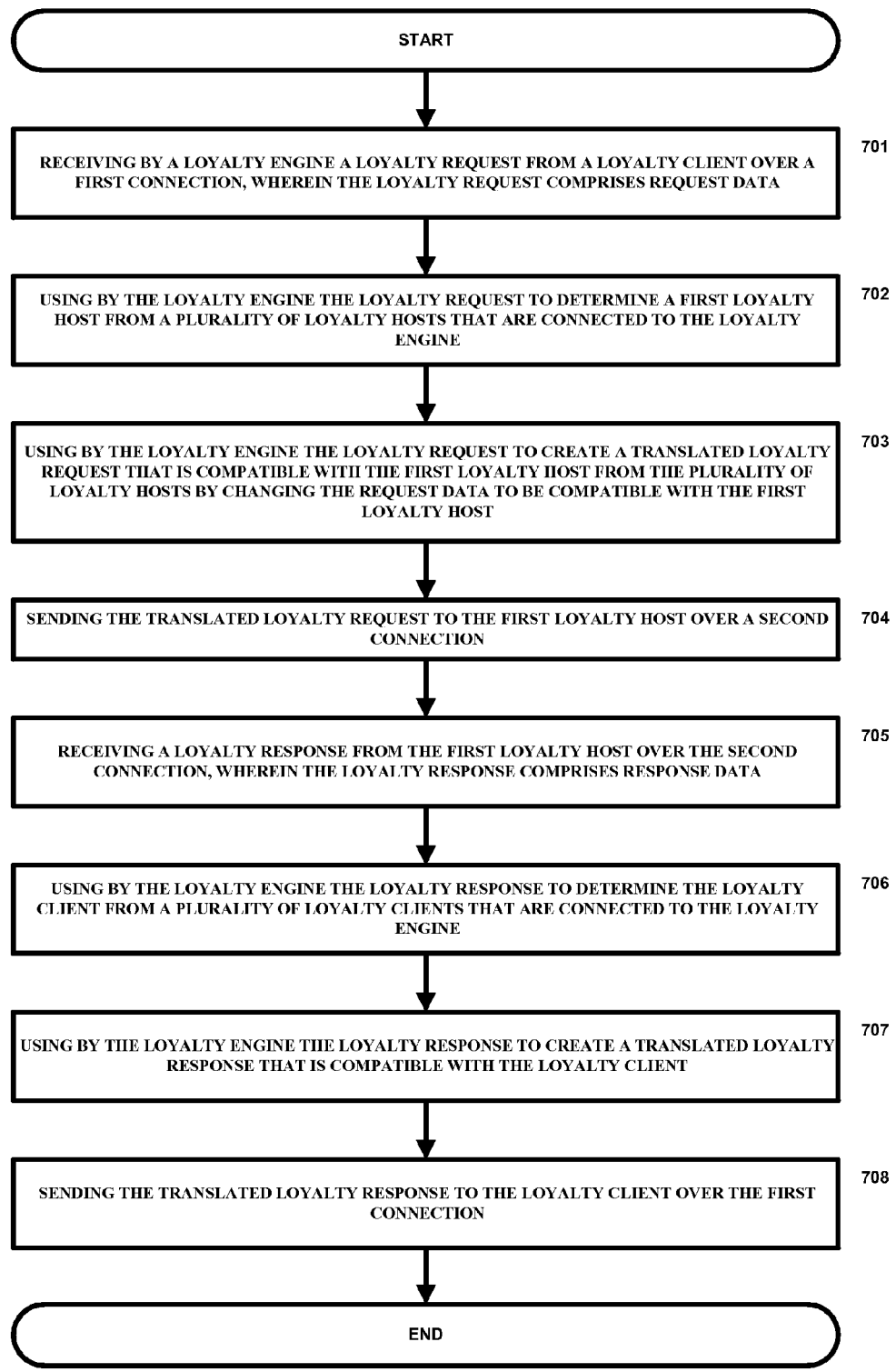
FIG. 7 illustrates a method of a further embodiment of the present invention.

A further method for translating loyalty requests between loyalty clients and loyalty hosts is shown in FIG. 7. First in the method of FIG. 7, a loyalty engine receives 701 a loyalty request from a loyalty client over a first connection, wherein the loyalty request comprises request data. Second, the loyalty engine uses 702 the loyalty request to determine a first loyalty host from a plurality of loyalty hosts that are connected to the loyalty engine.

The loyalty engine then uses 703 the loyalty request to create a translated loyalty request that is compatible with the first loyalty host from the plurality of loyalty hosts by changing the request data to be compatible with the first loyalty host, and the translated loyalty request is then sent 704 to the first loyalty host over a second connection. Fifth, a loyalty response is received 705 from the first loyalty host over the second connection, wherein the loyalty response comprises response data, and the loyalty engine uses 706 the loyalty response to determine the loyalty client from a plurality of loyalty clients that are connected to the loyalty engine. Seventh, the loyalty engine uses 707 the loyalty response to create a translated loyalty response that is compatible with the loyalty client. Finally, the translated loyalty response is sent 708 to the loyalty client over the first connection.

Any embodiment of the present invention, such as the embodiment of FIG. 7, can comprise using by the loyalty engine the loyalty request to create a translated loyalty request that is compatible with a first loyalty host from the plurality of loyalty hosts by changing a data format of the request data to be compatible with the first loyalty host, such as by converting the request data to XML.

The loyalty engine of various embodiments can perform various request or response translation tasks. For example, the loyalty engine can use the loyalty request to create a translated loyalty request that is compatible with a first loyalty host from the plurality of loyalty hosts by changing the request data to be compatible with the first loyalty host. Changing the request data to be compatible with the first loyalty host from the plurality of loyalty hosts can, for example, comprise performing a string operation on the request data.

In further embodiments, using by the loyalty engine the loyalty response to create a translated loyalty response that is compatible with the loyalty client from the plurality of loyalty clients can comprise using by the loyalty engine the loyalty response to create a translated loyalty response that is compatible with the loyalty client from the plurality of loyalty clients by translating a logical communications protocol or a physical communications protocol of the first loyalty host to be compatible with the loyalty client. Similarly, using by the loyalty engine the loyalty response to create a translated loyalty response that is compatible with the loyalty client from the plurality of loyalty clients can comprise using by the loyalty engine the loyalty response to create a translated loyalty response that is compatible with the loyalty client from the plurality of loyalty clients by changing a data format and/or changing the response data to be compatible with the loyalty client from the plurality of loyalty clients. For example, string operations can be performed on the response data.

Another embodiment of the present invention provides a computer program product carried in a computer readable medium, wherein the computer program product is encoded to perform a method for translating loyalty requests between loyalty clients and loyalty hosts, such as the method shown in FIG. 7. First, a loyalty engine receives a loyalty request from a loyalty client over a first connection, wherein the loyalty request comprises request data. Second, the loyalty engine uses the loyalty request to determine a first loyalty host from a plurality of loyalty hosts that are connected to the loyalty engine. The loyalty engine then uses the loyalty request to create a translated loyalty request that is compatible with the first loyalty host from the plurality of loyalty hosts by changing the request data to be compatible with the first loyalty host, and the translated loyalty request is then sent to the first loyalty host over a second connection. Fifth, a loyalty response is received from the first loyalty host over the second connection, wherein the loyalty response comprises response data, and the loyalty engine uses the loyalty response to determine the loyalty client from a plurality of loyalty clients that are connected to the loyalty engine. The loyalty engine uses the loyalty response to create a translated loyalty response that is compatible with the loyalty client. Finally, the translated loyalty response is sent to the loyalty client over the first connection.

A further embodiment of the present invention provides a system comprising a processor programmed to perform a method for translating loyalty requests between loyalty clients and loyalty hosts, such as the method shown in FIG. 7. First, a loyalty engine receives a loyalty request from a loyalty client over a first connection, wherein the loyalty request comprises request data. Second, the loyalty engine uses the loyalty request to determine a first loyalty host from a plurality of loyalty hosts that are connected to the loyalty engine. The loyalty engine then uses the loyalty request to create a translated loyalty request that is compatible with the first loyalty host from the plurality of loyalty hosts by changing the request data to be compatible with the first loyalty host, and the translated loyalty request is then sent to the first loyalty host over a second connection. Then, a loyalty response is received from the first loyalty host over the second connection, wherein the loyalty response comprises response data, and the loyalty engine uses the loyalty response to determine the loyalty client from a plurality of loyalty clients that are connected to the loyalty engine. The loyalty engine then uses the loyalty response to create a translated loyalty response that is compatible with the loyalty client. Finally, the translated loyalty response is sent to the loyalty client over the first connection.

While the present invention has been described in detail in connection with various embodiments, it should be understood that the present invention is not limited to the above-disclosed embodiments. Rather, the invention can be modified to incorporate any number of variations, alternations, substitutions, or equivalent arrangements not heretofore described, but which are commensurate with the spirit and scope of the invention.

We claim:

1. A method comprising:
(a) receiving by a loyalty engine a loyalty request comprising request data from a loyalty client over a first connection, wherein the loyalty request comprises (i) an AUTH message which can be used to validate a potential loyalty sales transaction, (ii) an AUTH_CANCEL message which can be used to cancel the potential loyalty sales transaction after the potential loyalty sales transaction has been validated but before the potential loyalty sales transaction is fully tendered, and (iii) a STATUS message which can be used to query a loyalty host of a plurality of loyalty hosts that are connected to the loyalty engine to determine if the loyalty host is offline or if an error condition has occurred by the loyalty host;
(b) determining by the loyalty engine, based on the loyalty request, a first loyalty host of the plurality of loyalty hosts that are connected to the loyalty engine;
(c) creating by the loyalty engine, based on the loyalty request, a translated loyalty request using a first communication protocol that is compatible with the first loyalty host by changing the request data to be compatible with the first loyalty host;
(d) sending the translated loyalty request to the first loyalty host, using the first communication protocol, over a second connection;
(e) receiving at the loyalty engine a loyalty response to the translated loyalty request, the loyalty response comprising response data from the first loyalty host over the second connection and using the first protocol;
(f) creating by the loyalty engine, based on the loyalty response, a translated loyalty response using a second communication protocol that is compatible with the loyalty client; and
(g) sending the translated loyalty response to the loyalty client, using the second communication protocol, over the first connection.

2. The method of claim 1, wherein step (c) comprises creating by the loyalty engine, based on the loyalty request, a translated loyalty request that is compatible with a first loyalty host by changing a data format of the request data to be compatible with the first loyalty host.

3. The method of claim 2, wherein changing a data format of the request data to be compatible with the first loyalty host comprises converting the request data to a specified markup language.

4. The method of claim 3, wherein the specified markup language comprises XML.

5. The method of claim 1, wherein step (f) comprises creating by the loyalty engine, based on the loyalty response, a translated loyalty response that is compatible with the loyalty client by changing a data format of the response data to be compatible with the loyalty client.

6. The method of claim 5, wherein changing a data format of the response data to be compatible with the loyalty client comprises converting the response data to a specified markup language.

7. The method of claim 6, wherein the specified markup language comprises XML.

8. The method of claim 1, wherein the AUTH message can be further used to lock points during the potential loyalty sales transaction, and the AUTH_CANCEL message can be further used to release locked points during the potential loyalty sales transaction.

9. The method of claim 1, wherein the loyalty request further comprises a STATUS message which can be used to query a loyalty host of the plurality of loyalty hosts to determine if the loyalty host is offline or if an error condition has occurred by the loyalty host.

10. The method of claim 1, wherein the method is performed by a computer having a memory executing one or more programs of instructions which are tangibly embodied in a program storage medium readable by the computer.

11. A method comprising:
(a) receiving by a loyalty engine a loyalty request comprising request data from a loyalty client over a first connection, wherein the loyalty request comprises (i) an AUTH message which can be used to lock points during a potential loyalty sales transaction, (ii) an AUTH_CANCEL message which can be used to indicate to a loyalty host that locked points should be released during the potential loyalty sales transaction, (iii) a CAPTURE message which can be used to unlock points for any unused rewards during the potential loyalty sales transaction, and (iv) a STATUS message which can be used to query a loyalty host of a plurality of loyalty hosts that are connected to the loyalty engine to determine if the loyalty host is offline or if an error condition has occurred by the loyalty host;
(b) determining by the loyalty engine, based on the loyalty request, a first loyalty host of the plurality of loyalty hosts that are connected to the loyalty engine;
(c) creating by the loyalty engine, based on the loyalty request, a translated loyalty request using a first communication protocol that is compatible with the first loyalty host by changing the request data to be compatible with the first loyalty host;
(d) sending the translated loyalty request to the first loyalty host, using the first communication protocol, over a second connection;
(e) receiving at the loyalty engine a loyalty response to the translated loyalty request, the loyalty response comprising response data from the first loyalty host over the second connection and using the first protocol;
(f) creating by the loyalty engine, based on the loyalty response, a translated loyalty response using a second communication protocol that is compatible with the loyalty client; and
(g) sending the translated loyalty response to the loyalty client, using the second communication protocol, over the first connection.

12. The method of claim 11, wherein the AUTH_CANCEL message is further used to indicate that no CAPTURE message will be sent for a given loyalty sales transaction.

13. The method of claim 11, wherein the AUTH message and the AUTH_CANCEL message are linked to a corresponding CAPTURE message using a host authorization code.

14. The method of claim 11, wherein the method is performed by a computer having a memory executing one or more programs of instructions which are tangibly embodied in a program storage medium readable by the computer.

15. A method of operating a loyalty engine which is (i) operatively connected over a generic-client protocol to a first loyalty client, (ii) operatively connected over a proprietary-client protocol to a second loyalty client which is different from the first loyalty client, (iii) operatively connected over a generic-host protocol to a first loyalty host, and (iv) operatively connected over a host-specific protocol to a second loyalty host which is different from the first loyalty host, the method comprising:

(a) receiving a first loyalty request comprising request data over the generic-client protocol from the first loyalty client;
(b) based upon the first loyalty request received from the first loyalty client in step (a), determining if the first loyalty request is to be directed to the first loyalty host or the second loyalty host;
(c) creating a first translated loyalty request to be transmitted over the generic-host protocol to the first loyalty host when a determination is made from step (b) that the first loyalty request is to be directed to the first loyalty host, and creating a second translated loyalty request to be transmitted over the host-specific protocol to the second loyalty host when a determination is made in step (b) that the first loyalty request is to be directed to the second loyalty host;
(d) sending the first translated loyalty request over the generic-host protocol to the first loyalty host when the first translated loyalty request is created in step (c), and sending the second translated loyalty request over the host-specific protocol to the second loyalty host when the second translated loyalty request is created in step (c);
(e) receiving a first loyalty response including response data over the generic-host protocol from the first loyalty host when the first translated loyalty request has been sent in step (d) to the first loyalty host, and receiving a second loyalty response including response data over the host-specific protocol from the second loyalty host when the second translated loyalty request has been sent in step (d) to the second loyalty host;
(f) creating a first translated loyalty response to be transmitted over the generic-client protocol to the first loyalty client when the first loyalty response is received in step (e), and creating a second translated loyalty response to be transmitted over the generic-client protocol to the first loyalty client when the second loyalty response is received in step (e); and
(g) sending the first translated loyalty response over the generic-client protocol to the first loyalty client when the first translated loyalty response is created in step (f), and sending the second translated loyalty response over the generic-client protocol to the first loyalty client when the second translated loyalty response is created in step (f).

16. The method of claim 15, further comprising:
(h) receiving a second loyalty request comprising request data over the proprietary-client protocol from the second loyalty client;
(i) based upon the second loyalty request received from the second loyalty client in step (h), determining if the second loyalty request is to be directed to the first loyalty host or the second loyalty host;
(j) creating a third translated loyalty request to be transmitted over the generic-host protocol to the first loyalty host when a determination is made from step (i) that the second loyalty request is to be directed to the first loyalty host, and creating a fourth translated loyalty request to be transmitted over the host-specific protocol to the second loyalty host when a determination is made in step (i) that the second loyalty request is to be directed to the second loyalty host;
(k) sending the third translated loyalty request over the generic-host protocol to the first loyalty host when the third translated loyalty request is created in step (j), and sending the fourth translated loyalty request over the host-specific protocol to the second loyalty host when the fourth translated loyalty request is created in step (j);

(l) receiving a third loyalty response including response data over the generic-host protocol from the first loyalty host when the third translated loyalty request has been sent in step (k) to the first loyalty host, and receiving a fourth loyalty response including response data over the host-specific protocol from the second loyalty host when the fourth translated loyalty request has been sent in step (k) to the second loyalty host;

(m) creating a third translated loyalty response to be transmitted over the proprietary-client protocol to the second loyalty client when the third loyalty response is received in step (l), and creating a fourth translated loyalty response to be transmitted over the proprietary-client protocol to the second loyalty client when the fourth loyalty response is received in step (l); and (n) sending the third translated loyalty response over the proprietary-client protocol to the second loyalty client when the third translated loyalty response is created in step (m), and sending the fourth translated loyalty response over the proprietary-client protocol to the second loyalty client when the fourth translated loyalty response is created in step (m).

17. The method of claim 15, wherein the method is performed by a computer having a memory executing one or more programs of instructions which are tangibly embodied in a program storage medium readable by the computer.

* * * * *